(12) United States Patent
Fair et al.

(10) Patent No.: US 9,665,578 B2
(45) Date of Patent: *May 30, 2017

(54) ASSIMILATION OF FOREIGN LOGICAL UNITS IN A NETWORK STORAGE CONTROLLER

(71) Applicant: NetApp, Inc., Sunnyvale, CA (US)

(72) Inventors: Robert L. Fair, Cary, NC (US);
Rebecca S. Beaman, Redding, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,396

(22) Filed: Aug. 20, 2013

(65) Prior Publication Data

US 2014/0156600 A1 Jun. 5, 2014

Related U.S. Application Data

(63) Continuation of application No. 12/113,096, filed on Apr. 30, 2008, now Pat. No. 8,515,917.

(51) Int. Cl.
*G06F 17/30* (2006.01)
*G06F 3/06* (2006.01)

(52) U.S. Cl.
CPC ...... *G06F 17/30076* (2013.01); *G06F 3/0607* (2013.01); *G06F 3/067* (2013.01); *G06F 3/0632* (2013.01); *G06F 3/0664* (2013.01)

(58) Field of Classification Search
CPC ...... G06F 17/30; G06F 3/0689; G06F 3/0629; G06F 3/0632; G06F 3/0638

USPC ............................. 707/624, 635, 655, 656
See application file for complete search history.

(56) References Cited

U.S. PATENT DOCUMENTS

| | | | |
|---|---|---|---|
| 6,732,230 B1 | 5/2004 | Johnson et al. | |
| 7,133,964 B2 * | 11/2006 | Rodrigues et al. | 711/114 |
| 7,155,460 B2 * | 12/2006 | McGovern et al. | 707/999.201 |
| 7,194,579 B2 * | 3/2007 | Robinson et al. | 711/114 |
| 8,515,917 B1 | 8/2013 | Fair et al. | |
| 2003/0182494 A1 * | 9/2003 | Rodrigues et al. | 711/100 |
| 2004/0186858 A1 * | 9/2004 | McGovern et al. | 707/200 |
| 2005/0086249 A1 | 4/2005 | Keohane et al. | |
| 2005/0240725 A1 * | 10/2005 | Robinson et al. | 711/114 |

OTHER PUBLICATIONS

Non Final Office Action mailed Sep. 3, 2010 in Co-Pending U.S. Appl. No. 12/113,096 of Fair, R., et al., filed Apr. 30, 2008.
Final Office Action mailed Feb. 18, 2011 in Co-Pending U.S. Appl. No. 12/113,096 of Fair, R., et al., filed Apr. 30, 2008.
Non Final Office Action mailed Oct. 26, 2012 in Co-Pending U.S. Appl. No. 12/113,096 of Fair, R., et al., filed Apr. 30, 2008.
Notice of Allowance mailed Apr. 17, 2013 in Co-Pending U.S. Appl. No. 12/113,096 of Fair, R., et al, filed Apr. 30, 2008.

* cited by examiner

*Primary Examiner* — Vincent F Boccio
(74) *Attorney, Agent, or Firm* — LeClairRyan, a Professional Corporation

(57) ABSTRACT

A method of making a foreign law in usable in a network storage controller includes transparently converting the foreign logical unit to the native format of the file system in place, by progressively increasing the binding between the file system of the storage controller and the foreign logical unit, while the foreign logical unit remains online, without requiring copying of the foreign logical unit.

18 Claims, 13 Drawing Sheets

ASSIMILATION OF FOREIGN LOGICAL UNITS IN A NETWORK STORAGE CONTROLLER

CROSS REFERENCE TO RELATED APPLICATION

This application is a continuation application of U.S. patent application Ser. No. 12/113,096, filed on Apr. 30, 2008, and entitled "ASSIMILATION OF FOREIGN LOGICAL UNITS IN A NETWORK STORAGE CONTROLLER," which is incorporated herein in its entirety by reference.

FIELD OF THE INVENTION

At least one embodiment of the present invention pertains to network storage systems, and more particularly, to a technique for assimilating a foreign logical unit in a network storage controller.

BACKGROUND

A network storage controller is a processing system that is used to store and retrieve data on behalf of one or more clients on a network. A storage controller operates on behalf of one or more clients to store and manage data in a set of mass storage devices, such as magnetic or optical storage-based disks or tapes. Some storage controllers are designed to service file-level requests from clients, as is commonly the case with file servers used in a network attached storage (NAS) environment. Other storage controllers are designed to service block-level requests from clients, as with storage servers used in a storage area network (SAN) environment. Still other storage controllers are capable of servicing both file-level requests and block-level requests, as is the case with certain storage controllers made by NetApp, Inc. of Sunnyvale, Calif.

In a SAN environment, it is possible to place a storage controller in front of a separate SAN array of mass storage devices, such as disks, where the array is organized as a pool of logical units that can be exported to remote hosts. A "logical unit" is a logical container of data, which is sometimes called a "LUN" (logical unit number). In certain cases a logical unit might not have the native file system format used by the storage controller, such as when the SAN array is from a different vendor than that of the storage controller, or when different products from the same vendor use different file system formats and are deployed in the same system. If a logical unit does not have the native file system format used by the storage controller, it is referred to as a "foreign" logical unit.

In one known system available on the market today, a foreign logical unit can be made usable in the storage controller by reformatting the foreign logical unit on disk with a storage controller specific format and then presenting the reformatted logical unit to remote hosts as native storage from the storage controller. This approach has the advantage of allowing the foreign logical unit to be effectively used, including any storage controller value-added functionality (e.g., snapshotting, mirroring, cloning). However, the foreign logical unit is offline (inaccessible to a client) while the reformatting is being performed. Also, this approach requires that any existing data stored on the foreign logical unit be overwritten or that it be copied to intermediate storage before reformatting and then copied back after reformatting is complete. Overwriting involves undesirable loss of data from the logical unit, while copying out to intermediate storage and then back again is time-consuming and interferes with normal servicing of client requests.

In another application of foreign logical units, the foreign logical unit is utilized in a pass-through mode in the storage controller, where there is one-to-one mapping between the foreign logical unit data and a native logical unit presented from the storage controller. Updates to the native logical unit, if allowed, are passed directly to the foreign logical unit. This approach does not involve reformatting the foreign logical unit to the native file system format. It has the advantage of allowing the foreign logical unit data to be preserved and rapidly presented by the storage controller to the client. However, this approach has the disadvantage that storage controller specific value-added functionality is typically limited or simply inaccessible, since the foreign logical unit is not represented natively in the storage controller.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
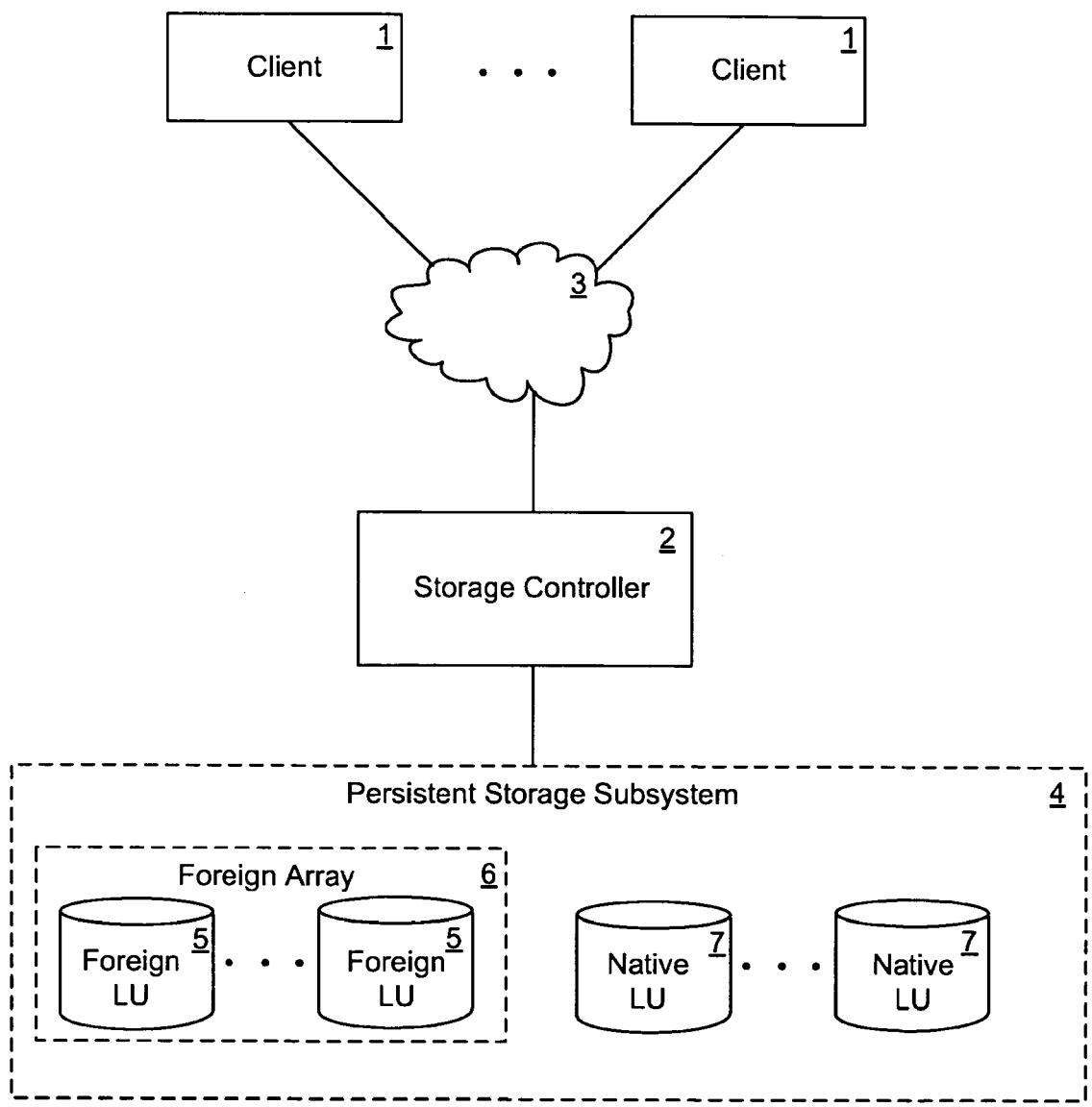
FIG. 1 illustrates a network storage system environment.

A method and apparatus for assimilating a foreign logical unit in a network storage controller are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, however, they also do not necessarily refer to mutually exclusive embodiments.

In accordance with the technique introduced here, a foreign logical unit is made usable in a network storage controller by "assimilating" the foreign logical unit, while the foreign logical unit remains fully online to storage clients (hosts). In this context, "assimilating" is the process of converting a foreign logical unit to the native format of the file system of the storage controller by progressively increasing the binding between the file system and the foreign logical unit. The term "online" here means that from the perspective of a storage client (host), the logical unit is readable and writable in response to host-initiated requests. In accordance with the technique introduced here, the foreign logical unit is converted in-place from original (foreign) format to native format transparently to clients, without requiring the foreign logical unit to be copied out to intermediate storage, while immediately allowing significant functionality of the storage controller to be applied to the foreign logical unit.

For example, a logical unit on a storage array from a particular vendor, Vendor A, containing a database may be placed behind a storage controller from another vendor, Vendor B. In accordance with the technique introduced here, the storage controller from Vendor B continues to make this data available, including allowing updates to the data, while assimilating the data in the foreign logical unit to have native Vendor B specific formatting, for example, by adding RAID labels and/or modifying disk sector layout.

In this specification, the term "logical unit" means any form of logical container of data, such as a data block, a file, a directory, a volume, or what is commonly called a "LUN". The term "foreign logical unit" means a logical unit that has a format different from the native format of the particular file system under consideration.

In one embodiment, the data in the foreign logical unit is preserved and immediately presented to remote hosts through a native logical unit created in the storage controller, without requiring a copy. Updates to the data are allowed via the native logical unit but are not necessarily reflected in the foreign logical unit, depending on the configuration and state of the system. A close binding is created between the storage controller logical unit and the storage controller file system, allowing many storage controller value-added features to be used immediately (e.g., snapshotting, mirroring, cloning). Assimilation includes modifying the information in the foreign logical unit to apply native file system formatting, for example by adding RAID labels and/or modifying sector formatting, without requiring the foreign logical unit data to be overwritten or copied temporarily to intermediate storage, i.e., the data in the foreign logical unit is converted to native file system format in place (i.e., on its original physical storage device(s)), while on-line. After assimilation is complete, the foreign logical unit is fully serviceable as a native logical unit of the storage controller and all storage controller value-added features are available.

Refer now to FIG. 1, which shows a network storage system in which the present invention can be implemented. In FIG. 1, a storage controller 2 is coupled to a persistent storage subsystem (PSS) 4 and to a set of clients 1 (e.g., SAN hosts) through an interconnect 3. The interconnect 3 can be, for example, a Fibre Channel fabric. Alternatively, the interconnect can be, for example, a local area network (LAN), wide area network (WAN), metropolitan area network (MAN), global area network such as the Internet, or any combination of such interconnects. Each of the clients 1 may be, for example, a conventional personal computer (PC), server-class computer, workstation, handheld computing/communication device, or the like.

Storage of data in the PSS 4 is managed by the storage controller 2. The storage controller 2 receives and responds to various read and write requests from the clients 1, directed to data stored in or to be stored in the PSS 4. The PSS 4 includes a number of nonvolatile mass storage devices (not shown), which can be, for example, conventional magnetic or optical disks or tape drives; alternatively, they can be non-volatile solid-state memory, such as flash memory, or any combination of such devices. The mass storage devices in PSS 4 can be organized as a Redundant Array of Inexpensive Disks (RAID), in which case the storage controller 2 may access the PSS 4 using a conventional RAID algorithm for redundancy.

The PSS 4 initially includes one or more native logical units (LUs) 7 (logical units formatted according to the format of the file system of the storage controller 2) and one or more foreign logical units 5 (logical units formatted differently from the format of the file system of the storage controller 2). The foreign logical units 5 may be included in a foreign array 6, which may be an array (e.g., disk array) manufactured or sold by a manufacturer or vendor other than that of the storage controller 2. Any given logical unit can be contained within a single physical mass storage device (e.g., a disk drive), or it can be distributed (e.g., striped) across two or more physical mass storage devices.

For purposes of this description, it is assumed that the storage controller 2 provides clients 1 with block-level data access services and the illustrated environment is a SAN environment. In other embodiments, however, the storage controller 2 may provide file-level data access services to clients, such as commonly done in a NAS environment, or it may be capable of providing both file-level and block-level data access services to clients 1. Further, although the storage controller 2 is illustrated as a single unit in FIG. 1, it can have a distributed architecture. For example, the storage controller 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

Figure 2:
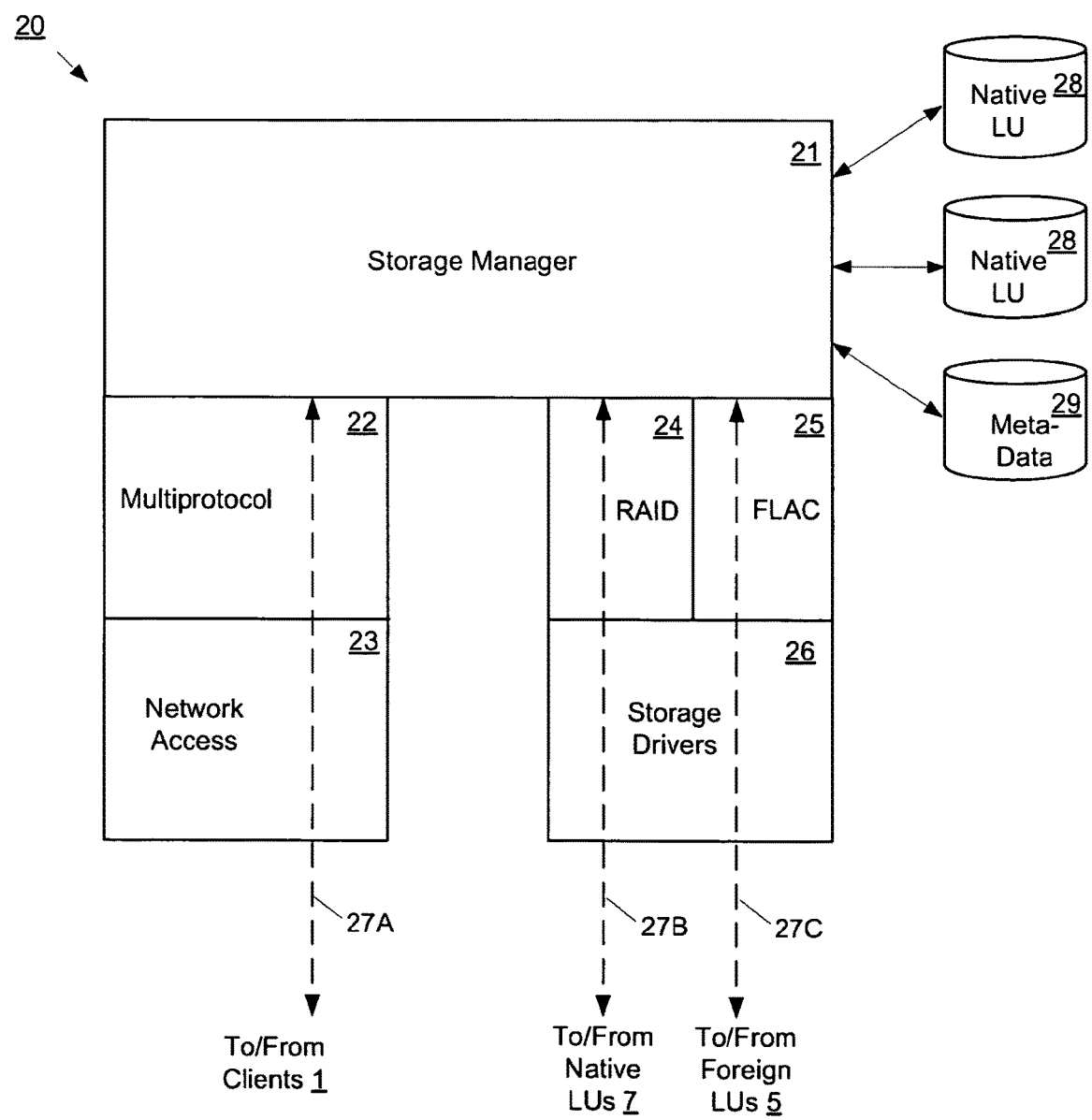
FIG. 2 schematically illustrates an example of the architecture of a storage operating system in a storage controller.

In certain embodiments, operation of the storage controller 2 is controlled by executable software embodying a storage operating system within the storage controller 2. FIG. 2 schematically illustrates an example of the architecture of such storage operating system. In the illustrated embodiment, the storage operating system 20 includes several software modules, or "layers". Note that in alternative embodiments, any or all of these layers, or any or all of their functions, can be implemented in dedicated hardware rather than executable software. The layers include a storage manager 21, which is the core functional element of the storage operating system 20. The storage manager 21 imposes a structure (e.g., a hierarchy) on the data stored in the PSS 4; in other words, storage manager 31 manages a file system. Storage manager 21 also services read and write requests from clients 1. Note that the term "file system" is only used herein to facilitate explanation to mean a structured system of data and does not imply that the data must be in the form of files per se. That is, the data in a "file system" can be stored in the form of raw data blocks or groups of data blocks, database records, or any other form of logical data container(s), and need not be stored in the form of files. A file system can be, but is not necessarily, a hierarchical structure of logical data containers, such as volumes, logical units, files, directories, subdirectories, etc.

To improve performance, the storage manager 21 accumulates batches of writes in a buffer cache of the storage controller 2 and then streams them to the PSS 4 as large, sequential writes. In certain embodiments, the storage manager 21 implements a journaling file system that implements a "write out-of-place" (also called "write anywhere") policy when writing data to the PSS 4. In other words, whenever a logical data block is modified, that logical data block, as modified, is written to a new physical storage location (physical block), rather than overwriting the data block in place.

Logically "under" the storage manager 21, to allow the storage controller 2 to communicate over the network 3 (e.g., with clients 1), the storage operating system 20 also includes a multiprotocol layer 22 and a network access layer 23. The multiprotocol 22 layer implements various higher-level network protocols, such as Network File System (NFS), Common Internet File System (CIFS), Hypertext Transfer Protocol (HTTP) and Internet small computer system interface (iSCSI). The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also logically under the storage manager 21, to allow the storage controller 2 to communicate with the PSS 4, the storage operating system 20 includes a RAID layer 24, a foreign logical unit assimilation and capture (FLAC) layer 25 and an associated storage driver layer 26. The RAID layer 24 implements a RAID scheme such as RAID-0, RAID-4, RAID-5 or RAID-DP, while the storage driver layer 26 implements a lower-level storage device access protocol, such as Fibre Channel Protocol (FCP) or small computer system interface (SCSI).

The FLAC layer 25, also called the "assimilation layer", handles the main aspects of the assimilation process, which is described further below. It manages the state of foreign logical units, provides input/output (I/O) translation services to the foreign units, and provides services to move foreign logical units and native file system through the various stages of the assimilation process.

Also shown in FIG. 2 are the possible paths 27A, 27B and 27C of data flow through the storage operating system 27, associated with a read or write operation, from the client interface to the PSS interface.

In certain embodiments, the storage operating system 20 has a distributed architecture. For example, the multiprotocol layer 22 and a network access layer 23 can be contained in an N-module (e.g., N-blade) while the storage manager 21, RAID layer 24, FLAC layer 25 and storage driver layer 26 are contained in a separate D-module (e.g., D-blade). In such an embodiment, the N-module and D-module can communicate with each other (and, possibly, other N- and D-modules) through some form of physical interconnect.

FIG. 2 also shows that the storage manager 21 maintains a number of native logical units 28 (logical units maintained by the storage controller 2 which have the native format of the storage controller's file system). The storage manager 21 also maintains various metadata structures 29 that represent the current status and configuration of each logical unit that it manages. Examples of such metadata are discussed below with reference to FIGS. 3 and 4.

Figure 3:
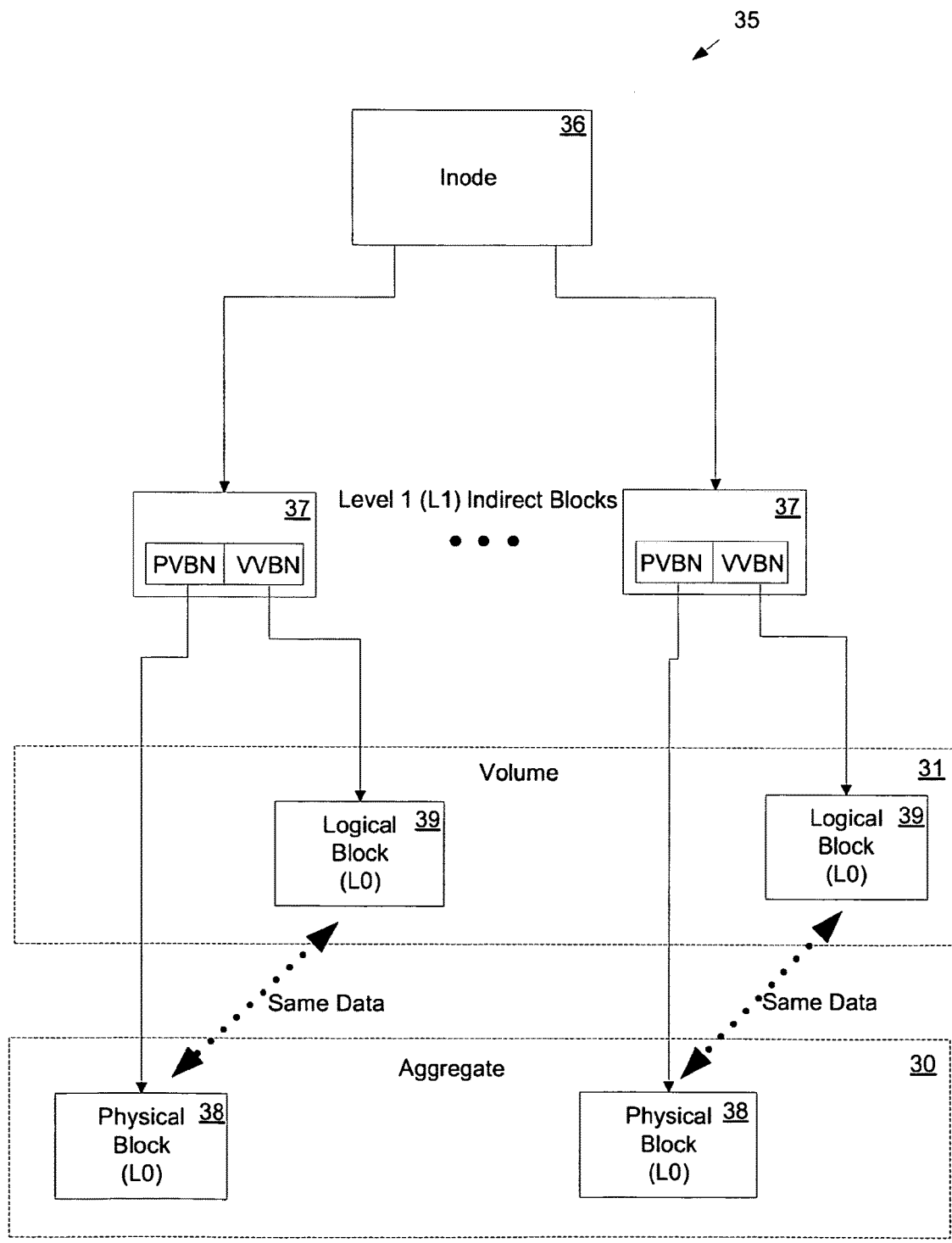
FIG. 3 shows an example of a buffer tree for a logical unit.
Figure 4:
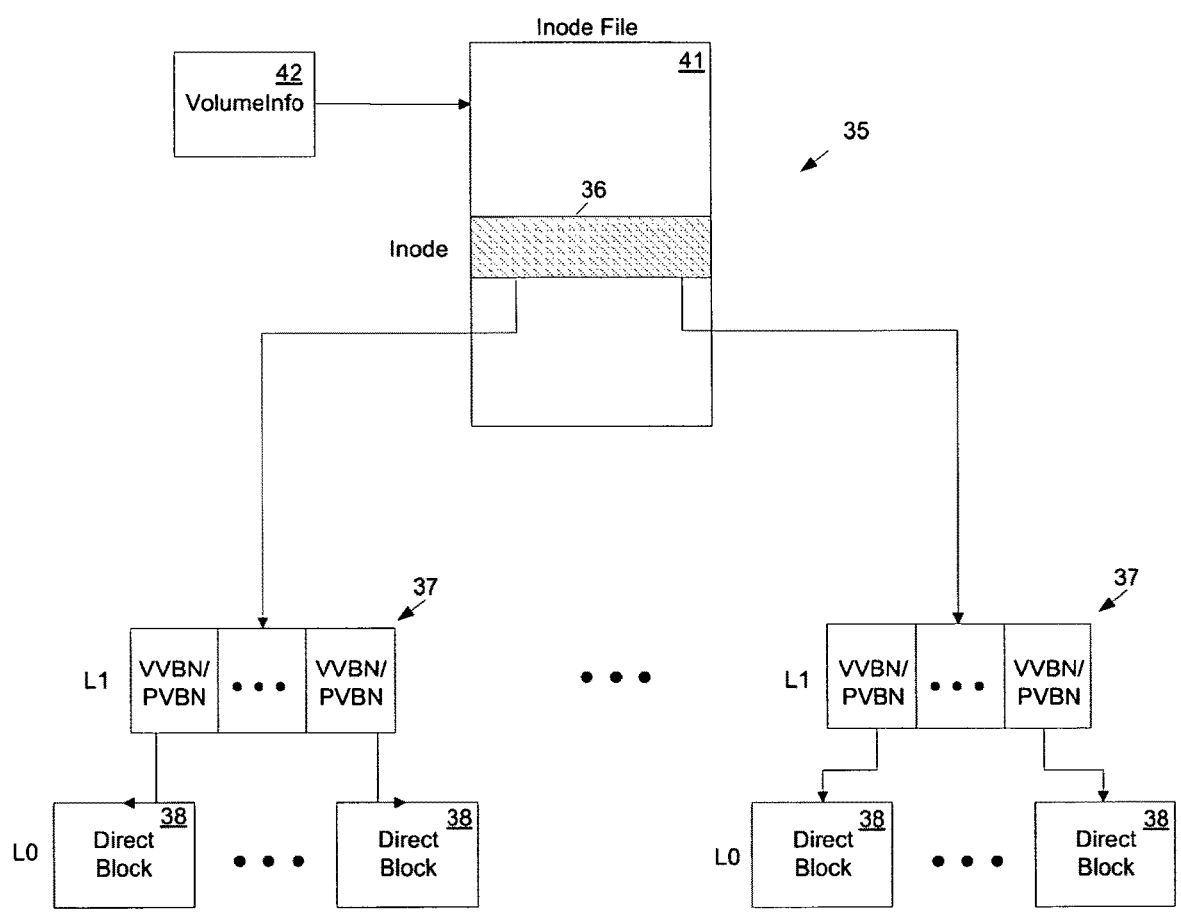
FIG. 4 shows the relationship between inodes, an inode file and a buffer tree.

It is useful now to consider how data storage can be structured by the storage controller 2 in certain embodiments. Reference is therefore made to FIGS. 3 and 4 in this regard.

In at least one embodiment, data is stored by the storage server 2 in the form of volumes, where each volume contains one or more logical units. The term "aggregate" is used to refer to a pool of storage, which combines one or more physical mass storage devices (e.g., disks) or parts thereof into a single logical storage object. The aggregate contains or provides storage for one or more other logical data sets at a higher level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more logical units.

In certain embodiments, an aggregate uses a physical volume block number (PVBN) space that defines the storage space of blocks provided by the storage devices of the physical volume, and each volume uses a "logical" or "virtual" volume block number (VVBN) space in order to organize those blocks as logical units. A PVBN, therefore, is an address of a physical block in the aggregate. A VVBN is an address of a block in a volume (the same block as referenced by the corresponding PVBN), i.e., the offset of the block within a file that represents the volume. Knowledge of all of the VVBNs and PVBNs is maintained by the storage manager 21. Each VVBN space is an independent set of values that corresponds to locations within a logical unit, which are translated by the storage access layer 34 to device block numbers (DBNs) on a physical storage device.

Each volume can be a separate file system that is "mingled" with other volumes onto a common set of storage in the aggregate by the storage operating system. The RAID layer 24 of the storage operating system 20 builds a RAID topology structure for the aggregate that guides each volume when performing write allocation. The RAID layer 24 also presents a PVBN-to-DBN mapping to the storage manager 21.

In certain embodiments, each logical unit managed by the storage server 2 is represented internally as a hierarchical structure called a "buffer tree". A buffer tree is a hierarchical structure which used to store logical unit data as well as metadata about a logical unit, including pointers for use in locating the data blocks for the logical unit. A buffer tree includes one or more levels of indirect blocks (called "L1 blocks", "L2 blocks", etc.), each of which contains one or more pointers to lower-level indirect blocks and/or to the direct blocks (called "L0 blocks") of the logical unit. All of the logical data in the logical unit is stored only at the lowest level (L0) blocks.

The root of a buffer tree is the "inode" of the logical unit. An inode is a metadata container which used to store metadata about the logical unit, such as ownership, access permissions, logical unit size, logical unit type, and pointers to the highest level of indirect blocks for the logical unit. Each logical unit has its own inode. The inode is stored in a separate inode logical unit, which may itself be structured as a buffer tree.

FIG. 3 shows an example of a buffer tree 35 for a logical unit. The logical unit 35 is assigned an inode 36, which references Level 1 (L1) indirect blocks 37. Each indirect block 37 stores at least one PVBN and a corresponding VVBN for each PVBN. Note that a VVBN is a logical block number in a volume, which is a virtual number for addressing; but there is only one copy of the L0 data block physically stored. Also, to simplify description, only one PVBN-VVBN pair is shown in each indirect block 37 in FIG. 3; however, an actual implementation would likely include multiple/many PVBN-VVBN pairs in each indirect block 37. Each PVBN references a physical block 38 in a storage device (i.e., in the aggregate 30) and the corresponding VVBN represents the corresponding logical block 39 in a file that represents the volume (called the "container file")

31. Physical blocks 38 and logical blocks 39 are actually the same L0 data for any particular PVBN-VVBN pair, however, they are accessed in different ways: The PVBN is accessed directly in the aggregate 30, while the VVBN is accessed virtually via the volume container file 31.

Referring now to FIG. 4, for each volume managed by the storage server 2, the inodes of the logical units and directories in that volume are stored in a separate inode file 41. A separate inode file 41 is maintained for each volume. Each inode 36 in an inode file 41 is the root of the buffer tree 35 of a corresponding logical unit. The location of the inode file 41 for each volume is stored in a Volume Information ("VolumeInfo") block 42 associated with that volume. The VolumeInfo block 42 is a metadata container that contains metadata that applies to the volume as a whole. Examples of such metadata include, for example, the volume's name, type, size, any space guarantees to apply to the volume, and the VVBN of the inode file of the volume.

Figure 5:
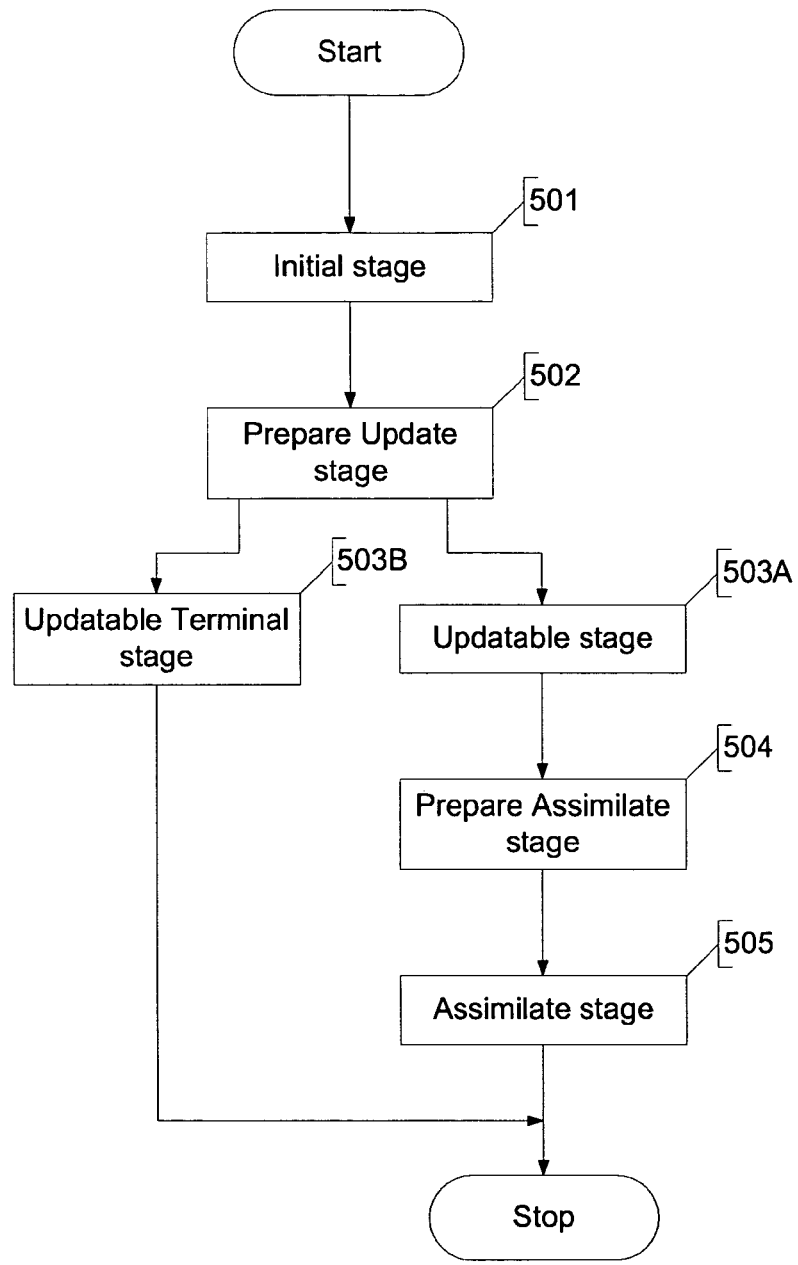
FIG. 5 is a flow diagram illustrating an example of a multi-stage process of assimilating a foreign logical unit.

The process of foreign logical unit assimilation will now be described in greater detail, according to one embodiment. Referring now to FIG. 5, in one embodiment the process includes five distinct stages performed in sequence: an Initial stage 501, a Prepare Update stage 502, and Updatable stage 503A, a Prepare Assimilate stage 504 and an Assimilate stage 505. These stages are a progression in which each stage increases the binding between the foreign logical unit and the file system of the storage controller 2 compared to the previous stage. This entire process is performed while the foreign logical unit is online. The operations included in these stages, which shall now be described, are performed in certain embodiments by the FLAC layer 25 (FIG. 2). In one embodiment, as described below, the assimilation process has an alternate branch following the Prepare Update stage 502, in which an Update Terminal stage 503B is performed instead of the Updatable stage 503A and subsequent stages.

Figure 6:
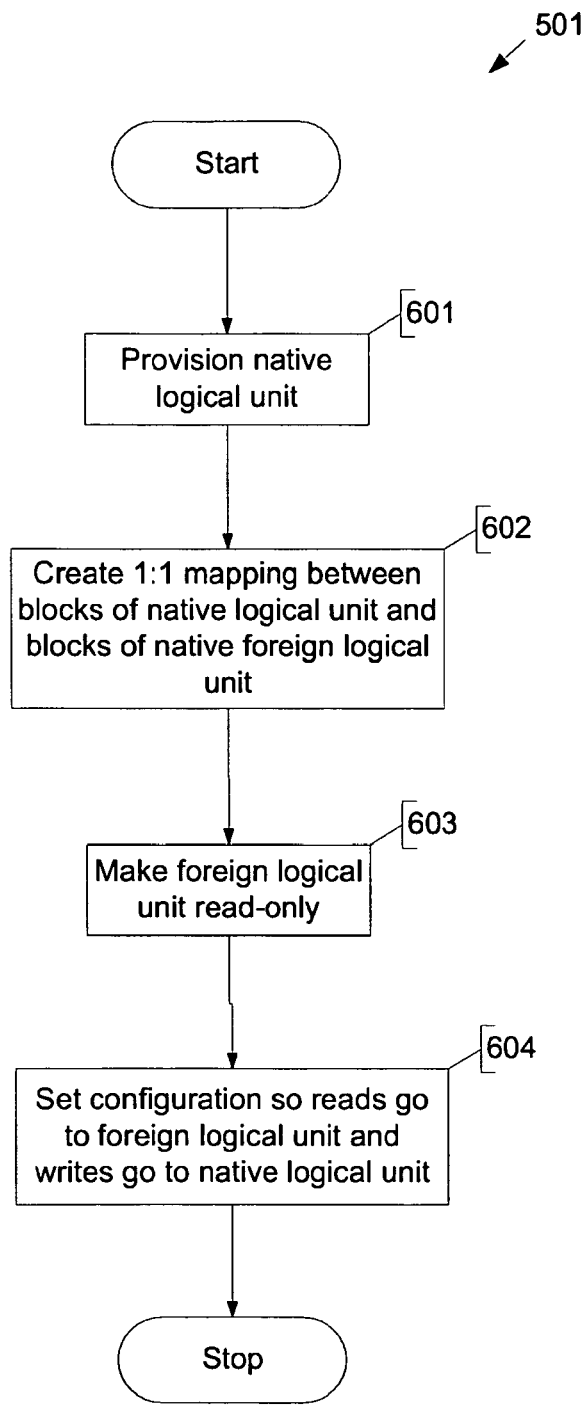
FIG. 6 is a flow diagram illustrating an example of the Initial stage of assimilation.
Figure 7:
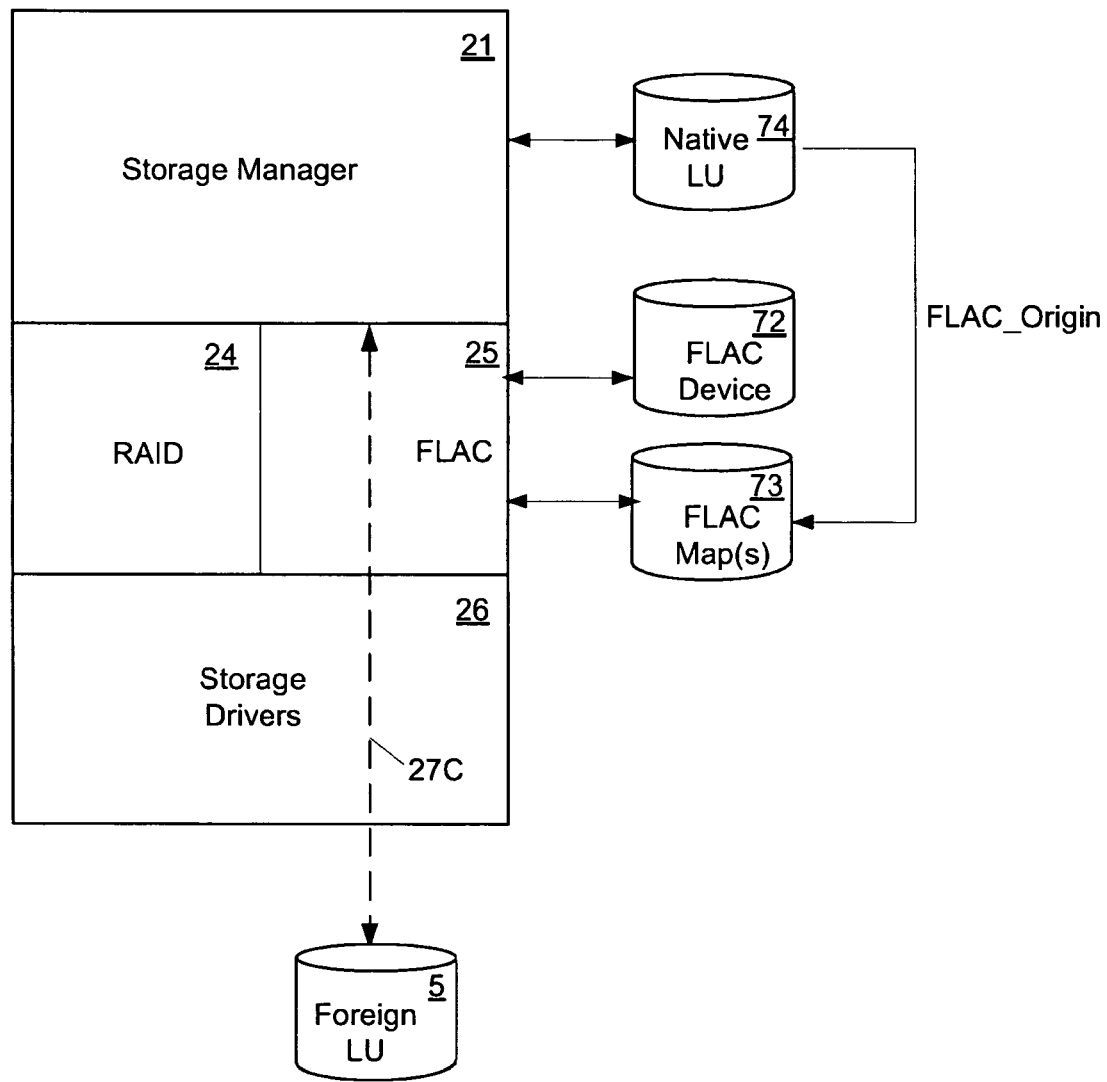
FIG. 7 schematically shows a portion of a storage operating system that includes a foreign logical unit assimilation and capture (FLAC) layer and associated data structures.

The Initial stage 501 is shown in greater detail in FIG. 6 according to one embodiment. As shown, the Initial stage 501 includes provisioning a native logical unit in the storage controller to represent the foreign logical unit (601), as shown in FIG. 7, and creating a one-to-one mapping between the data blocks in the native logical unit and the data blocks in the foreign logical unit (602). The data in the native logical unit is a virtual copy of the foreign logical unit data, in that metadata is created to point from the native logical unit to the foreign logical unit. The Initial stage further includes making the foreign logical unit read-only (603), and then setting the configuration of the storage controller 2 so that client reads are made from the foreign logical unit, but client writes targeted at the foreign logical unit are redirected to the native logical unit (604).

The Initial stage 501 can be completed very quickly, since few significant data structures are assigned or updated beyond the mapped logical unit and certain FLAC metadata structures (discussed below). In this stage, writes targeted to the foreign logical unit are reflected in the native file system using a normal buffer tree representing the native logical unit. No changes are made to the contents of the foreign logical unit upon updates to the native logical unit. No physical address space (PVBN space) is allocated for the foreign logical unit in the underlying aggregate in this stage; instead, access to it is only through the FLAC layer.

Certain FLAC metadata structures are maintained and used by the FLAC layer to redirect or manage input/output (I/O) operations to the foreign logical unit as necessary or to determine or manage system information as necessary (e.g., map files). As shown in FIG. 7, these metadata structures include, for each foreign logical unit 5 being assimilated, a FLAC Device metadata structure 72 (or simply "FLAC device" 72) and at least one FLAC map 73. The FLAC device 72 describes a specific foreign logical unit 5 that is undergoing assimilation. The information in a FLAC device 72 includes: an identifier of the foreign logical unit being assimilated, the size of the foreign logical unit, the current stage of assimilation of the logical unit, and the number of FLAC maps using the FLAC device.

The FLAC map 73 provides the connection between a foreign logical unit 5 and the native file system during the assimilation process. The information in a FLAC map 73 includes: an identifier of the FLAC device 72 that provides the backing for the FLAC map 73, the associated aggregate in the native file system, the mapped logical unit in the native file system, the mapped virtual address space (VVBN range) in the corresponding virtual volume, and the mapped physical address space (PVBN range) in the corresponding physical volume, if any.

Note that when foreign logical unit blocks are subsequently modified and written to a new location, indirect blocks are created that may have a mixture of PVBNs corresponding to actual storage and unchanged PVBNs, accesses to which still need to be redirected to the FLAC layer 25. The latter type of PVBNs can be identified by using a special PVBN, e.g., a VBN_PVBN_FLAC_REDIRECT pointer. Consider, for example, an L1 indirect block referring to two L0 data blocks, called D1 and D2. Initially, when the indirect block is created data blocks D1 and D2 will each have a virtual location in the foreign logical unit, and so have no PVBN (the WBN contains the offset into the foreign logical unit). As a place-holder one can set the PVBNs to a special value, PVBN_FLAC_REDIRECT, so that the FLAC layer 25 can be invoked to read from the foreign logical unit. If, for example, data block D2 is then updated to a new location, it gains a real PVBN value, which is then reflected in the indirect block. By contrast, accesses to data block D1 are still redirected through the FLAC layer 25. Thus, any indirect block can contain a mixture of blocks that can be directly addressed by a PVBN and blocks that must be accessed by redirection through the FLAC layer 25.

A FLAC device 72 can be mapped to two or more native file systems, such as when a native clone volume is created. In this case, each native file system has a separate FLAC map 73 for the foreign logical unit 5, each of which points to the same FLAC device 72.

The native logical unit 74 created to represent the foreign logical unit has an additional persistent property, called FLAC_Origin, which denotes the FLAC map 73 that is the origin for the native logical unit 74. This property can be stored directly with the native logical unit 74, if such storage is available. A connection between the native logical unit 74 and the underlying FLAC map 73 is created when the native logical unit is provisioned, allowing for fast access to the FLAC map 73 upon future access.

Figure 8:
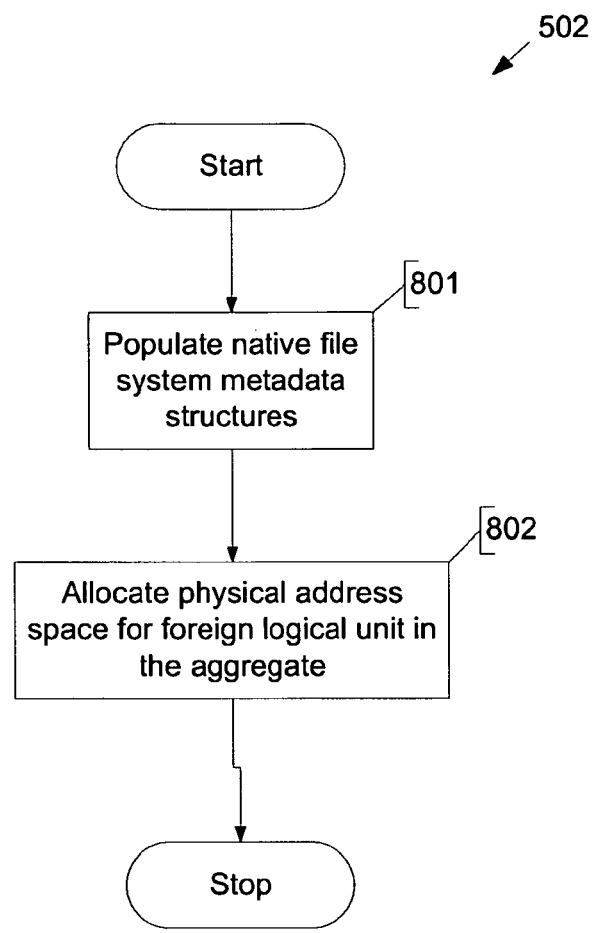
FIG. 8 is a flow diagram illustrating an example of the Prepare Update stage of assimilation.

The Initial stage 501 is followed by the Prepare Update stage 502, which is shown in greater detail in FIG. 8 according to one embodiment. The Prepare Update stage 502 prepares the system for closer binding between the foreign logical unit and the native file system. As shown, the Prepare Update stage 502 includes populating a native file system metadata structure in the file system to describe the foreign logical unit (801). The metadata structure can include, for example, indirect blocks referencing the foreign logical unit, a map which describes which blocks are used in an aggregate/volume, a map which describes which blocks are used in snapshots, and/or a map which describes the type of usage of each block in the aggregate/volume. This involves completely populating the native file system metadata structures in the file system to describe the foreign logical unit. In an alternative embodiment, the native file system metadata structures can be populated "lazily", e.g., as needed in response to receiving writes directed to data blocks of the foreign logical unit. The Prepare Update stage 502 further includes allocating physical address space for the foreign logical unit in the aggregate used by the file system (i.e., assigning PVBNs to the foreign logical unit) (802). However, access to this address space is still through the FLAC layer 25 until the assimilation process completes.

Upon completion of the Prepare Update stage 502, the Updatable stage 503A or the Updatable Terminal stage 503B is entered as an atomic change and executed. The selection of which of these to execute can be made by a storage network administrator before the assimilation process begins (e.g., as a configuration setting). Having two distinct types of Updatable stages, i.e., Updatable and Updatable Terminal, is advantageous for purposes of avoiding address space continuities, as discussed below.

The main difference between the Updatable stage 503A and the Updatable Terminal stage 503B is the allocation of PVBN space and the subsequent allowed stage transitions: In the Updatable stage 503A the PVBN space is allocated for the foreign logical unit in the aggregate using the same size as at final assimilation, whereas in the Updatable Terminal stage 503B the full foreign logical unit address space is mapped to the aggregate PVBN space, less potentially a small number of blocks for labeling. After performing the Updatable Terminal stage 503B, the assimilation process ends, whereas after the Updatable stage 503A, the Prepare Assimilate stage 504 is executed.

Figure 9:
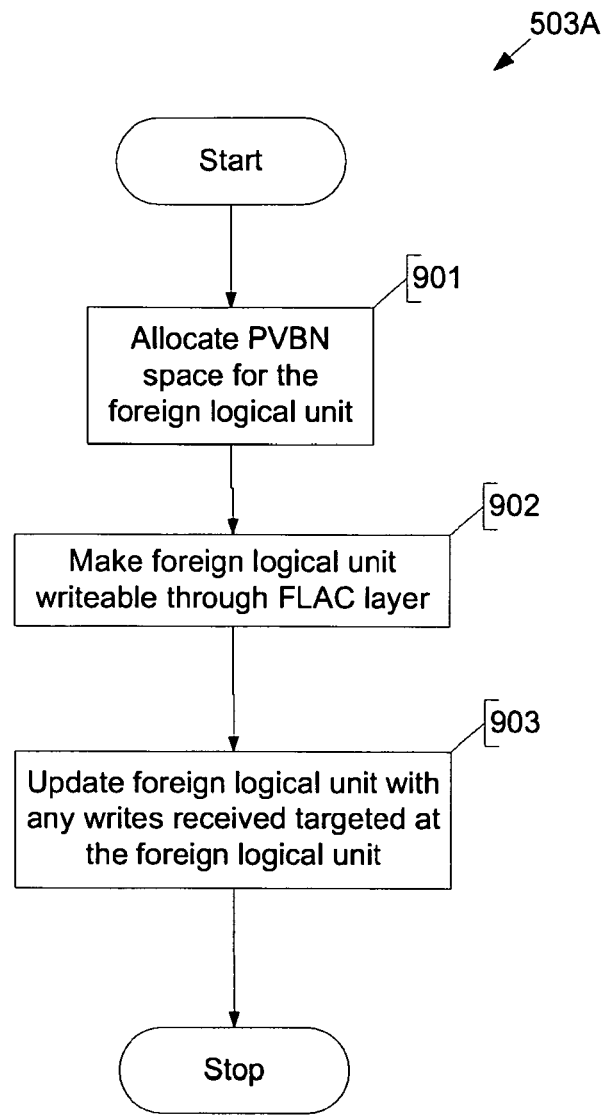
FIG. 9 is a flow diagram illustrating an example of the Updatable stage of assimilation.

The Updatable stage 503A is shown in FIG. 9 according to one embodiment. This stage further increases the binding between the foreign logical unit and the storage controller's file system by potentially allowing updates to the foreign logical unit. As shown, the Updatable stage 503A includes allocating a PVBN space for the foreign logical unit (901), and making the foreign logical unit writable by the file system through the FLAC layer 25 (902). The PVBN space is allocated for the foreign logical unit in the aggregate using the same size as at final assimilation. The foreign logical unit's format at this point is still just an array of data blocks; there is no special file system formatting. FLAC metadata structures continue to be used to redirect or manage I/O operations to the foreign logical unit as necessary. If any writes directed to the foreign logical unit are received by the storage controller 2 during the stage, then these writes are used to update the foreign logical unit accordingly (903).

As noted above, the Updatable Terminal stage 503B is similar to the Updatable stage 503A, except that the Updatable Terminal stage 503B allocates a larger PVBN space and terminates the assimilation process.

Figure 10:
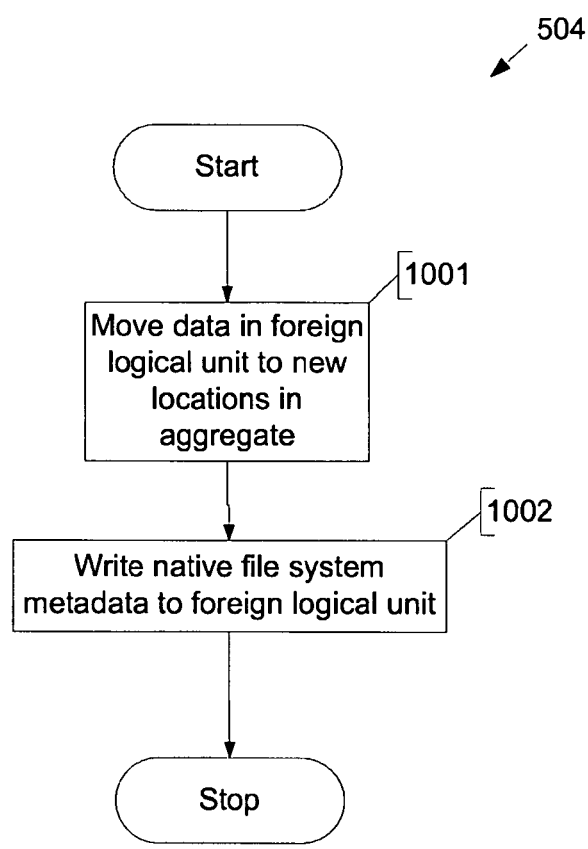
FIG. 10 is a flow diagram illustrating an example of the Prepare Assimilate stage of assimilation.

The Prepare Assimilate stage 504 is shown in FIG. 10 according to one embodiment. This stage prepares the foreign logical unit for final assimilation and native format. As shown, this stage includes moving data in the foreign logical unit to new locations in the storage aggregate (i.e., in the native file system) (1001), and writing metadata of the file system to locations in the foreign logical unit (1002). More specifically, this stage can include, for example, updating the foreign logical unit on-the-fly to move data blocks ready for accepting a native format, e.g., if the native format reserves the first N blocks of storage then data is relocated from those blocks in the foreign logical unit to allow for format data. Another example is preparing the foreign logical unit for "8/9 formatting" (i.e., altering the allocation of sectors on disk between data and metadata) where each 4 KB block is offset by one 512 byte sector to provide space for subsequent RAID metadata (such a move could fill in the necessary checksum information in the extra sector as part of the move). FLAC metadata structures 72 and 73 continue to be used to redirect or manage I/O operations to the foreign logical unit as necessary. At the end of this stage the foreign logical unit is ready to complete assimilation.

Figure 11:
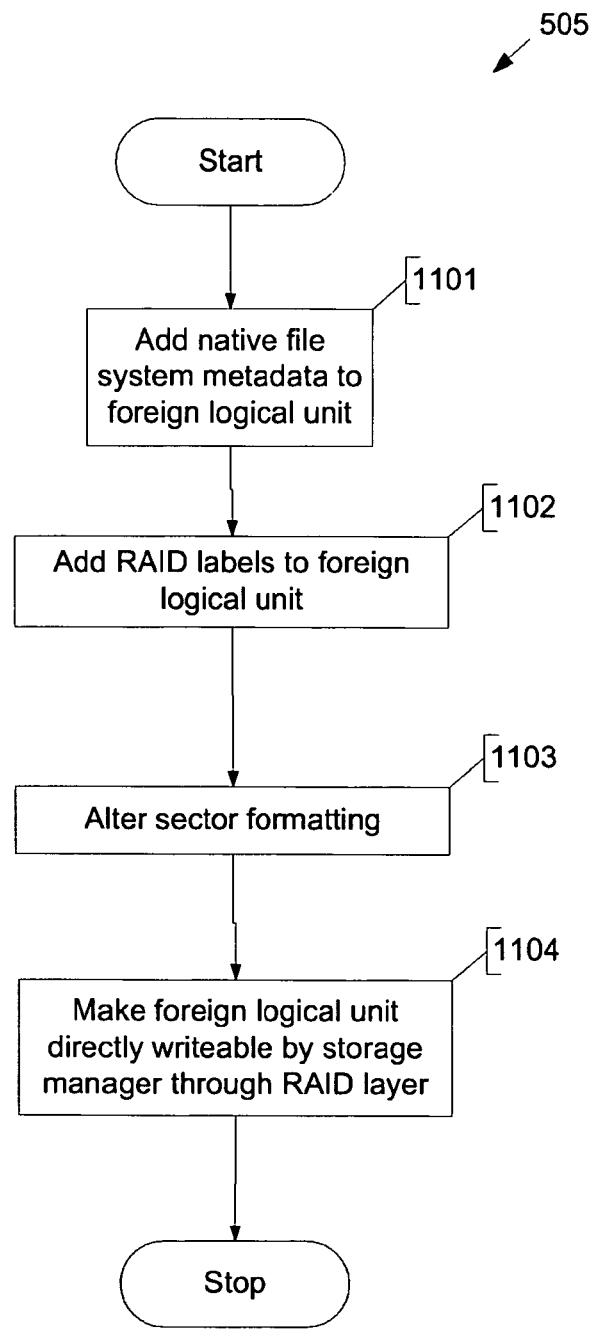
FIG. 11 is a flow diagram illustrating an example of the Assimilate stage of assimilation.
Figure 12:
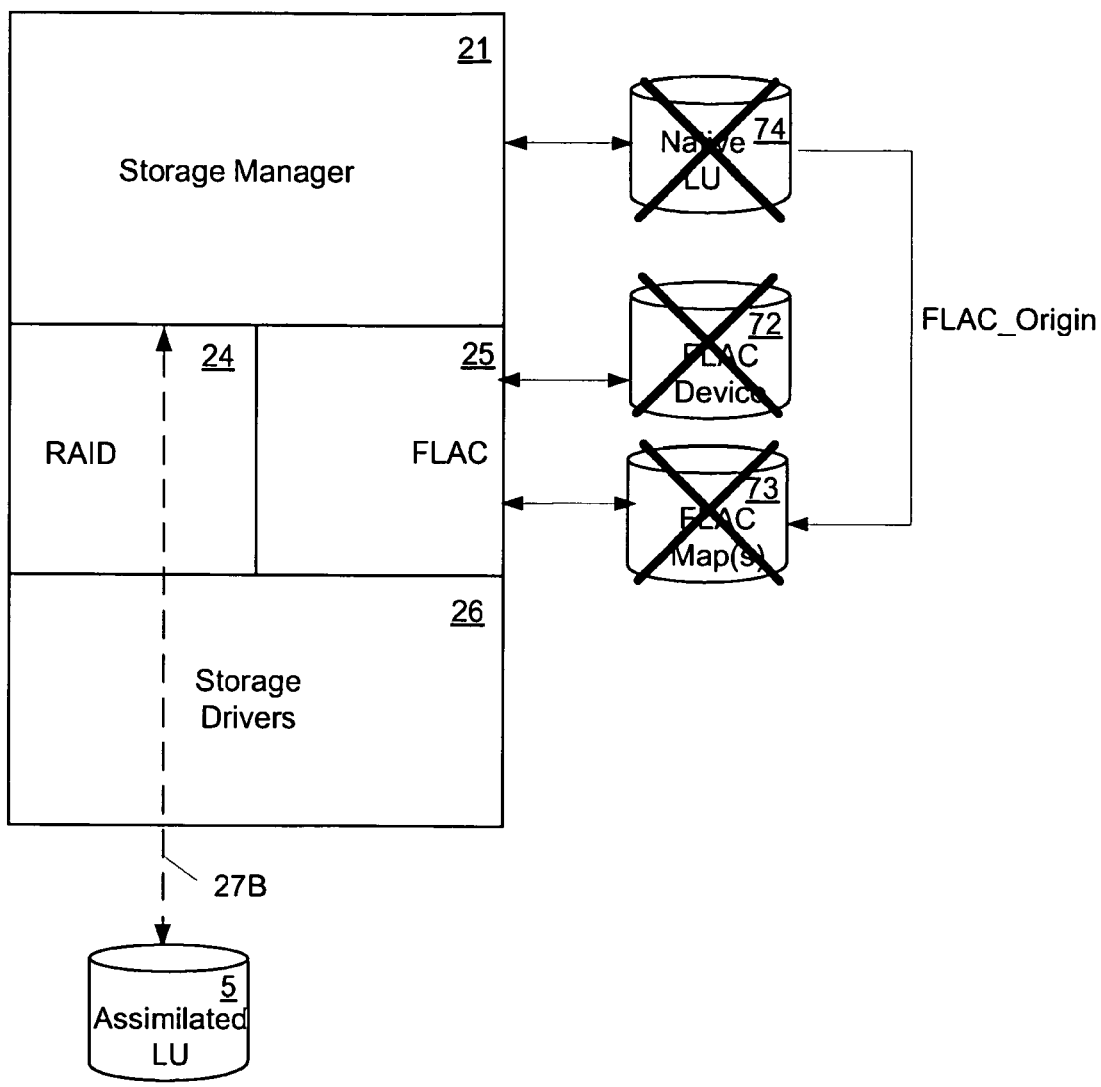
FIG. 12 illustrates the operation of the storage operating system after a foreign logical unit has been assimilated.

Finally, the Assimilate stage 505 is executed, which is shown in FIG. 11, according to one embodiment. In the illustrated embodiment, this stage includes writing simple metadata labels to the foreign logical unit to identify the foreign logical unit as a native logical unit of the file system (1101), adding appropriate RAID labels to the foreign logical unit corresponding to the particular RAID scheme used by RAID layer 24 (1102), altering the sector formatting of the foreign logical unit to correspond to the native file system format (1103), and changing the configuration setting in the storage manager 21 to make the foreign logical unit directly writable by the storage manager 31 in its native file system format, through the RAID layer 24, bypassing the FLAC layer 25, as shown in FIG. 12 (1104). At this point, all data access operations targeted at the "foreign" logical unit (or more precisely, the assimilated logical unit, since it is no longer really "foreign" at this point) go through the native file system and the RAID layer 24. All native features and functions of the storage controller 2 are available for the "foreign" (assimilated) logical unit. At the end of this process, all of the FLAC metadata structures 72 and 73 and the native logical unit 74 used to assimilate the "foreign" logical unit can be deleted, since they are no longer needed.

Note that the physical and virtual address space assigned by the FLAC layer 25 change as the stage of assimilation progresses and are a differentiator between phases and the available functionality. Consider first the virtual address space:

The virtual address space is a set of block addresses used in a volume and is also known as WBN space. The virtual address space used by a foreign logical unit is assigned when the process enters the Initial stage. The virtual address space is the full size of the foreign logical unit (and also the full size of the mapped native logical unit as seen in the file system). This does not change as the stage of assimilation progresses. For example, when a 500 GB foreign logical unit enters the Initial stage, it is assigned 500 GB of virtual address space in a volume, and the mapped native logical unit is assigned a size of 500 GB.

The physical address space, on the other hand, is a set of block addresses used in the aggregate, and is also known as PVBN space. In the Initial stage 501 a foreign logical unit has no PVBN space assigned. In the Updatable Terminal stage 502B a foreign logical unit is assigned PVBN space corresponding to the full size of the foreign logical unit, less a small number of blocks for a minimal label. In contrast, in the Updatable stage 503A a foreign logical unit is assigned PVBN space corresponding to the assimilated size of the foreign logical unit. In the final Assimilated stage 505 the PVBN space is mapped to a native RAID group with the same size as the foreign logical unit.

For example, assume once again that a 500 GB foreign logical unit enters the Initial stage 501. No PVBN space is assigned. The foreign logical unit subsequently enters the Updatable stage 503A. Assuming the system uses an aggregate with 8/9 formatting, approximately 450 GB of usable PVBN space is assigned. When final assimilation completes the foreign logical unit will hold approximately 450 GB of data, with the remainder being used for native file system metadata such as RAID checksum and formatting.

As another example, assume that a decision is made by a network administrator to use the foreign logical unit for maximum storage, but not full assimilation. In that case, after the Prepare Update stage 502 the foreign logical unit enters the Updatable Terminal stage 503B, with approximately 500 GB of PVBN space assigned in the aggregate for storage.

In the context of the above described technique, it is useful to consider how block address space discontinuities, or "holes", may be handled. A block address space is usually considered as a contiguous set of addresses. Discontinuities in a block address space are block addresses without any usable storage. Discontinuities can complicate operation of a file system and, in general, are best avoided. For example, removing a RAID group from an aggregate can create a discontinuity in PVBN space. Depending on the implementation, some of the foreign logical unit assimilation operations or stage transitions discussed above may introduce holes in both PVBN and VVBN space, and are therefore discussed as follows.

Now consider the WBN space. In the embodiment described above, a foreign logical unit occupies VVBN address space in a volume. As an example, if a 100 GB logical unit is mapped through the FLAC layer, then a 100 GB native logical unit is created in the volume, reserving 100 GB of WBN space in the volume (of course, the volume may need to grow to accommodate the logical unit.). That is, all blocks in the foreign logical unit are addressable by VVBN in the volume, although the actual storage is through the FLAC layer, so the backing container is sparse. If a foreign logical unit is disconnected from the FLAC layer, then the native logical unit is destroyed, and the VVBN space is released. Because VVBN space is virtual, this can then be reused for other write operations (or the volume can be shrunk if desired).

Now consider the PVBN space. A foreign logical unit uses no PVBN address space in the Initial stage. If a foreign logical unit in such a state is disconnected, no change is necessary. If, however, a foreign logical unit proceeds to the Updatable or Updatable Terminal stage, PVBN space is assigned. Such address space may have a one-to-one mapping to the foreign logical unit blocks (in the Updatable Terminal stage, except for label blocks) or an M-to-N mapping to the foreign logical unit blocks (in the Updatable stage).

If the foreign logical unit is subsequently disconnected after becoming Updatable, it is possible for a discontinuity/hole to be created in PVBN space. This might happen if, for example, additional foreign logical units or native RAID groups have been added to the aggregate between the time of assimilation and disconnect. This situation may be difficult for a file system to manage, so it may be prudent to disallow disconnecting a foreign logical unit in these stages, unless the native file system adequately supports such operation.

A more specialized creation of a PVBN discontinuity could occur if the Updatable Terminal stage were allowed to proceed to full assimilation. In the Updatable Terminal stage there is close to a one-to-one mapping from PVBN to foreign logical unit blocks; for example, a 100 GB logical unit uses 100 GB of PVBN space. On the other hand, a fully assimilated foreign logical unit may have its usable blocks reduced due to RAID formatting; thus, fewer blocks are needed in file system PVBN space to fully address the logical unit storage, and so a discontinuity in PVBN space would occur on transition from one stage to the next.

To prevent this from happening, the technique introduced above uses two distinct Updatable stages, Updatable and Updatable Terminal, as described above. The Updatable stage only allocates the PVBN space needed for final assimilation, so when assimilation occurs no discontinuity is introduced. The Updatable Terminal stage allocates the full PVBN space to match the foreign logical unit size.

It is also useful to consider how PVBN numbering often interacts with lower-level subsystems. PVBN numbering often interacts with lower-level subsystems in a storage device that is aware of physical devices and performs mapping of a PVBN to a specific device. For example, the RAID layer 34 may be aware that PVBN N may map to RAID Group 2, Disk 7, disk block N+4096. Similar mappings may be performed by volume managers that manage multiple physical storage devices and coalesce them for higher level software. As a result, the PVBN space for a foreign logical unit needs to be cognizant of interactions with the physical devices in the system, especially RAID, volume managers, and associated disk components.

In this regard, note that devices in a system (e.g. whole disks, or partitions of disks via a partition table) typically use a label to describe the device and its usage/mappings. A label is one or a few blocks in well-known locations on the device. The contents of the labels allow the device to be largely self configuring; for example, in one known storage operating system, the label contains not only a version number, unique user ID, etc., but also a table of contents describing the areas of the disk. Another part of the label describes how the disk fits into RAID trees used by the storage operating system, including Disk, Group, Plex, and Volume information. Of note, the Group information describes the other devices used in the RAID group, their usage and their mapping in the group, start offset, size etc.

When part of the PVBN space is assigned to a foreign logical unit in accordance with the technique introduced above, not only is this range appropriately reserved in the lower level components of the system (RAID, volume manager), but the lower level components also incorporate this into their data structures. For example, the PVBN range is assigned in a RAID group, in a plex, etc. As part of creation of the PVBN space for an updatable foreign logical unit, a minimal RAID label is written to the foreign logical unit, incorporating the logical unit into appropriate RAID components but labeled as a FLAC-type device. A FLAC-labeled device can be assimilated into a RAID group, listed in device maps etc. but does not follow the normal formatting of a device (for example, normal RAID devices may have mailbox areas, kernel areas, core dump areas, etc., none of which exist on a FLAC-labeled foreign logical unit device). This integration with RAID allows normal RAID functions, such as adding additional devices (including other FLAC foreign logical units and/or native disks) to operate.

Figure 13:
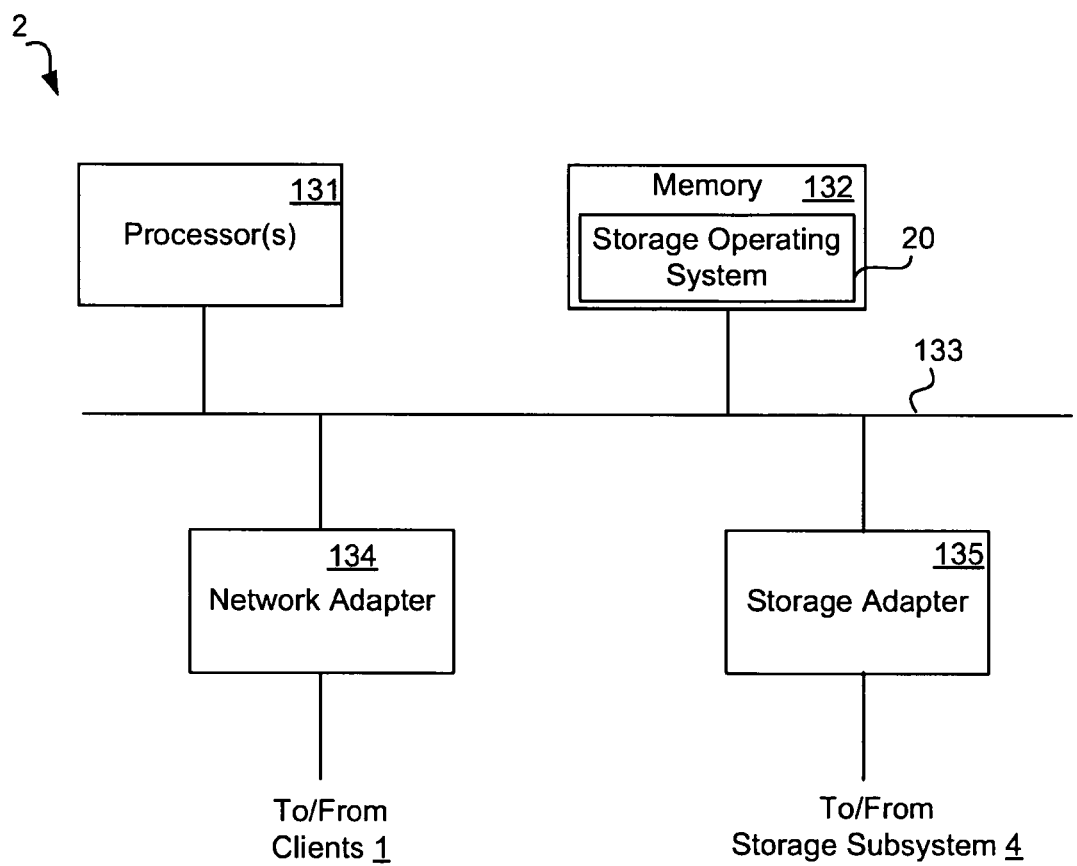
FIG. 13 is a high-level block diagram showing an example of the physical architecture of a storage controller.

FIG. 13 is a high-level block diagram showing an example of the physical architecture of the storage controller 2. The storage controller 2 includes one or more processors 131 and memory 132 coupled to an interconnect 133. The interconnect 133 shown in FIG. 13 is an abstraction that represents any one or more separate physical buses, point-to-point connections, or both connected by appropriate bridges, adapters, or controllers. The interconnect 133, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 131 may include central processing units (CPUs) of the storage controller 2 and, thus, control the overall operation of the storage controller 2. In certain embodiments, the processor(s) 131 accomplish this by executing software or firmware stored in memory 132. The processor(s) 131 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 132 is or includes the main memory of the storage controller 2. The memory 132 represents any form of random access memory (RAM), read-only memory (ROM), flash memory, or the like, or a combination of such devices. In use, the memory 132 may contain, among other things, at least a portion of the storage operating system 20 of the storage controller 2.

Also connected to the processor(s) 131 through the interconnect 133 are a network adapter 134 and a storage adapter 135. The network adapter 134 provides the storage controller 2 with the ability to communicate with remote devices, such as clients 1, over the interconnect 3 and may be, for example, an Ethernet adapter or Fibre Channel adapter. The storage adapter 135 allows the storage controller 2 to access the PSS 4 (including, for example, a foreign logical unit) and may be, for example, a Fibre Channel adapter, SCSI adapter, or other similar device.

Thus, a method and apparatus for assimilating a foreign logical unit in a network storage controller have been described. By using the technique introduced here, the data in a foreign logical unit is made immediately available in the storage controller logical unit without requiring a full copy. A high level of storage controller value-added functionality is immediately available, and the foreign logical unit contents are transformed into native storage controller format while online to provide maximum functionality.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    allocating, by a computing device, a plurality of data blocks in a storage aggregate to a foreign logical unit, wherein the plurality of data blocks in the storage aggregate are in a native file system format and the foreign logical unit comprises a foreign file system format that is different from the native file system format in the storage aggregate;
    mapping, by the computing device, the foreign logical unit and foreign logical unit label data to the plurality of data blocks in the storage aggregate, wherein the mapped foreign logical unit label data is associated with the native file system and indicates that the foreign logical unit is in the native file format; and
    converting, by the computing device, the mapped plurality of data blocks in the storage aggregate from the foreign file system format to the native file system format by progressively increasing a binding between the native file system and the foreign logical unit.

2. A method as recited in claim 1, wherein the progressively increasing the binding between the native file system and the foreign logical unit comprises transitioning through multiple stages, each stage resulting in additional binding between the native file system and the foreign logical unit.

3. A method as recited in claim 1, further comprising:
    adding, by the computing device, Redundant Array of Independent Disks (RAID) labels to the foreign logical unit.

4. A method as recited in claim 1, further comprising:
    altering, by the computing device, a sector formatting of the foreign logical unit, wherein the altering comprises changing a sector allocation in the plurality of data blocks.

5. A method as recited in claim 1, further comprising:
    receiving, by the computing device, writes targeted at the foreign logical unit, wherein the writes are reflected in the native file system based on a normal buffer tree.

6. A method as recited in claim 1, wherein the foreign logical unit comprises a hierarchical structure of logical data containers.

7. A computing device comprising a memory coupled to one or more hardware processors which are configured to execute programmed instructions stored in the memory comprising:
    allocate a plurality of data blocks in a storage aggregate to a foreign logical unit, wherein the plurality of data blocks in the storage aggregate are in a native file system format and the foreign logical unit comprises a foreign file system format that is different from the native file system format in the storage aggregate;
    map the foreign logical unit and foreign logical unit label data to the plurality of data blocks in the storage aggregate, wherein the mapped foreign logical unit label data is associated with the native file system and indicates that the foreign logical unit is in the native file format; and
    convert the mapped plurality of data blocks in the storage aggregate from the foreign logical unit file system format to the native file system format by progressively increasing a binding between the native file system and the foreign logical unit.

8. The computing device of claim 7, wherein the one or more hardware processors is further configured to execute programmed instructions stored in the memory to:
receive writes targeted at the foreign logical unit, wherein the writes are reflected in the native file system based on a normal buffer tree.

9. The computing device of claim 7, wherein progressively increasing the binding between the file system and the foreign logical unit comprises transitioning through multiple stages, each stage resulting in additional binding between the native file system and the foreign logical unit.

10. The computing device of claim 7, wherein the one or more hardware processors is further configured to execute programmed instructions stored in the memory to:
alter a sector formatting of the logical unit, wherein the altering comprises changing a sector allocation in the plurality of data blocks.

11. The computing device of claim 7, wherein the one or more hardware processors is further configured to execute programmed instructions stored in the memory to:
add Redundant Array of Independent Disks (RAID) labels to the foreign logical unit.

12. The computing device of claim 7, wherein the foreign logical unit comprises a hierarchical structure of logical data containers.

13. A non-transitory machine readable medium having stored thereon instructions for performing a method comprising machine executable code which when executed by at least one machine causes the machine to:
allocate a plurality of data blocks in a storage aggregate to a foreign logical unit, wherein the plurality of data blocks in the storage aggregate are in a native file system format and the foreign logical unit comprises a foreign file system format that is different from the native file system format in the storage aggregate;
map the foreign logical unit and foreign logical unit label data to the plurality of data blocks in the storage aggregate, wherein the mapped foreign logical unit label data is associated with the native file system and indicates that the foreign logical unit is in the native file format; and
convert the mapped plurality of data blocks in the storage aggregate from the foreign logical unit file system format to the native file system format by progressively increasing a binding between the native file system and the foreign logical unit.

14. The non-transitory machine readable medium of claim 13, wherein the progressively increasing the binding between the native file system and the foreign logical unit comprises transitioning through multiple stages, each stage resulting in additional binding between the native file system and the foreign logical unit.

15. The non-transitory machine readable medium of claim 13, further having stored thereon instructions which when executed by the at least one machine, cause the machine to:
add Redundant Array of Independent Disks (RAID) labels to the foreign logical unit.

16. The non-transitory machine readable medium of claim 13, further having stored thereon instructions which when executed by the at least one machine, cause the machine to:
altering a sector formatting of the foreign logical unit, wherein the altering comprises changing a sector allocation in the plurality of data blocks.

17. The non-transitory machine readable medium of claim 13, further having stored thereon instructions which when executed by the at least one machine, cause the machine to:
receiving writes targeted at the foreign logical unit, wherein the writes are reflected in the native file system based on a normal buffer tree.

18. The non-transitory machine readable medium of claim 13, wherein the foreign logical unit comprises a hierarchical structure of logical data containers.

* * * * *